United States Patent
Inha et al.

(10) Patent No.: US 10,865,932 B2
(45) Date of Patent: Dec. 15, 2020

(54) PLUMBING ARRANGEMENT (71) Applicant: Uponor Innovation Ab, Nastola (FI)

(72) Inventors: Teemu Inha, Jarvenpaa (FI); Mika Laurila, Hollola (FI)

(73) Assignee: UPONOR INNOVATION AB, Nastola (FI)

(*) Notice: Subject to any disclaimer, the term of this patent is extended or adjusted under 35 U.S.C. 154(b) by 53 days.

(21) Appl. No.: 16/292,015

(22) Filed: Mar. 4, 2019

(65) Prior Publication Data

US 2019/0271431 A1 Sep. 5, 2019

(30) Foreign Application Priority Data

Mar. 2, 2018 (EP) .................................... 18159736

(51) Int. Cl.
*F16L 59/02* (2006.01)
*F16L 59/135* (2006.01)

(52) U.S. Cl.
CPC ........... *F16L 59/028* (2013.01); *F16L 59/135* (2013.01)

(58) Field of Classification Search
CPC ....... F16L 59/135; F16L 59/14; F16L 59/143; F16L 3/26; F16L 3/1016
USPC .............................. 138/149, 107, 106; 248/62
See application file for complete search history.

(56) References Cited

U.S. PATENT DOCUMENTS

| | | | |
|---|---|---|---|
| 2,352,145 A * | 6/1944 | Wright ................... | F16L 59/135 248/58 |
| 4,140,483 A * | 2/1979 | Errington ................. | F27D 3/02 138/149 |
| 4,170,451 A * | 10/1979 | Luff ........................ | F27D 3/022 432/234 |
| 5,078,346 A | 1/1992 | Deichman | |
| 5,381,833 A | 1/1995 | Cummings | |
| 5,421,922 A * | 6/1995 | Sperber ................. | B05B 7/0025 156/71 |
| 7,757,722 B1 * | 7/2010 | Lesch, Jr. ............. | F16L 59/024 137/375 |
| 9,574,702 B2 * | 2/2017 | Steinhorst ............. | F16L 59/143 |
| 2006/0060256 A1 * | 3/2006 | Keyes ..................... | F16L 59/15 138/120 |
| 2012/0181413 A1 * | 7/2012 | Steinhorst ............. | F16L 59/135 248/636 |
| 2013/0305643 A1 * | 11/2013 | Singleton .................. | E04C 2/46 52/309.8 |

FOREIGN PATENT DOCUMENTS

| | | |
|---|---|---|
| DE | 3726540 A1 | 3/1988 |
| DE | 202017107712 U1 | 2/2018 |
| EP | 3219867 A1 | 9/2017 |
| GB | 2302385 A | 1/1997 |
| JP | 8261364 | 10/1996 |

OTHER PUBLICATIONS

Extended European Search Report, EP Application No. 18159736.0, dated Aug. 21, 2018, 10 pages.

* cited by examiner

*Primary Examiner* — Patrick F Brinson
(74) *Attorney, Agent, or Firm* — Brooks Kushman P.C.

(57) ABSTRACT

A plumbing arrangement having a pre-insulated pipe section. The pre-insulated pipe section includes a pipe and a thermal insulation layer of rigid foam molded to surround the pipe. The pre-insulated pipe section having fasteners made of rigid material fixedly connected to the insulation layer as integral parts for connecting the pre-insulated pipe section to another structure.

25 Claims, 5 Drawing Sheets

PLUMBING ARRANGEMENT

CROSS-REFERENCE TO RELATED APPLICATIONS

This application claims foreign priority benefits under 35 U.S.C. § 119(a)-(d) to EP Application Serial No. 18159736 filed Mar. 2, 2018, the disclosure of which is hereby incorporated in its entirety by reference herein.

FIELD OF THE INVENTION

The present invention relates to a plumbing arrangement.

BACKGROUND OF THE INVENTION

In prior art, e.g. from EP 3219867 A1, is known a plumbing arrangement comprising a pre-insulated pipe section. The pre-insulated pipe section comprises a pipe and a thermal insulation layer of rigid foam molded to surround the pipe. Typically, the pre-insulated pipe section is supported to another structure with fasteners, such as band fasteners, which are installed on-site from several separate individual parts which is cumbersome, time-consuming and costly. Also installation tolerances are difficult to manage in tight spaces wherein such pre-insulated pipe sections are installed.

OBJECTIVE OF THE INVENTION

It is an objective of the present invention to provide an improved plumbing arrangement.

It is also an objective of the present invention to provide a plumbing arrangement which can be easily and quickly installed on-site.

It is also an objective of the present invention to provide a plumbing arrangement having fasteners which are able to prevent structure-borne noise from the pipe to the structure to which the pre-insulated pipe section is connected by said fasteners.

It is also an objective of the present invention to provide a plumbing arrangement having fasteners which have a reduced number of parts.

The plumbing arrangement is particularly intended to be used in connection with prefabricated plumbing installation modules that are installed in a vertically aligned line in several sanitary spaces or partition walls arranged on top of each other, for example in an apartment building or block of flats with several floors. Further, the plumbing arrangement is particularly intended to be used as pre-insulated water pipes.

SUMMARY OF THE INVENTION

According to a first aspect, the present invention provides a plumbing arrangement comprising a pre-insulated pipe section, the pre-insulated pipe section comprising a pipe and a thermal insulation layer of rigid foam molded to surround the pipe. According to the invention the pre-insulated pipe section comprises fasteners made of rigid material fixedly connected to the insulation layer as integral parts for connecting the pre-insulated pipe section to another structure.

In one embodiment of the plumbing arrangement the fasteners are made metal of metal or rigid plastics.

In one embodiment of the plumbing arrangement the fasteners are partly embedded in the insulation layer.

In one embodiment of the plumbing arrangement the fasteners are bonded with an adhesive on the outer surface of the insulation layer.

In one embodiment of the plumbing arrangement the fasteners are bonded with a double sided tape on the outer surface of the insulation layer.

In one embodiment of the plumbing arrangement the fasteners are bonding fasteners.

In one embodiment of the plumbing arrangement the fastener comprises a baseplate comprising perforations which form passageways for the uncured foam during molding for securing the baseplate to the rigid foam, when being cured, and a fastening member arranged to the baseplate for connecting the pre-insulated pipe section to another structure.

In one embodiment of the plumbing arrangement the fastening member comprises a hole in the baseplate.

In one embodiment of the plumbing arrangement the fastening member comprises a nut connected to the baseplate coaxially with the hole.

In one embodiment of the plumbing arrangement the nut is a rivet nut.

In one embodiment of the plumbing arrangement the fastening member comprises a screw fixedly connected to the baseplate.

In one embodiment of the plumbing arrangement the screw is a rivet screw connected to the baseplate.

In one embodiment of the plumbing arrangement rigid foam of the insulation layer is expanded polyurethane or expanded polypropylene or expanded polystyrene or expanded polyisocyanurate.

In one embodiment of the plumbing arrangement the pre-insulated pipe section comprises at least two fasteners arranged at a distance from each other along the length of the pre-insulated pipe section.

In one embodiment of the plumbing arrangement the pre-insulated pipe section comprises a plurality of fasteners arranged at a distance from each other in a row along the length of the pre-insulated pipe section.

In one embodiment of the plumbing arrangement the pre-insulated pipe section comprises at least two rows of fasteners.

In one embodiment of the plumbing arrangement the plumbing arrangement comprises a prefabricated installation module having mounting means for mounting in a room of a building to form continuous vertical plumbing lines together with other similar installation modules, the installation module comprising the pre-insulated pipe section, and a frame made of metal and having an inner space into which the pre-insulated pipe section is installed and supported to the frame with said fasteners.

In one embodiment of the plumbing arrangement the frame comprises a support member comprising a counterpart configured for connection to the fastener.

In one embodiment of the plumbing arrangement the support member is movably connected to the frame.

In one embodiment of the plumbing arrangement the plumbing arrangement comprises a push fitting connected to an end part of the pipe protruding outside from the insulation layer of the pre-insulated pipe section.

In one embodiment of the plumbing arrangement the plumbing arrangement comprises an extension insulation section made of rigid foam and arranged in abutment with the pre-insulated pipe section, the extension insulation section having an external dimension conforming to the an external dimension of the pre-insulated pipe section, and an inner channel having an inner dimension adapted to receive the push fitting therein, the extension insulation section comprising two section halves having connecting elements for detachably connecting the section halves together.

In one embodiment of the plumbing arrangement the connecting elements are selected from the group: a hook and loop fastener, double-sided tape, a spike, a cable tie, a tongue and groove joint, a magnet.

In one embodiment of the plumbing arrangement the connecting elements are magnets which are embedded and molded-in in the rigid foam material of the section halves.

In one embodiment of the plumbing arrangement the rigid foam of the thermal insulation layer comprises a color pigment compounded to the foam material.

In one embodiment of the plumbing arrangement the rigid foam of the insulation layer has a density in the range of 20-120 kg/m$^3$.

In one embodiment of the plumbing arrangement the pre-insulated pipe section comprises a release agent, such as release wax, applied on a portion of length of the pipe to prevent bonding of the thermal insulation layer to the pipe at said portion of length.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
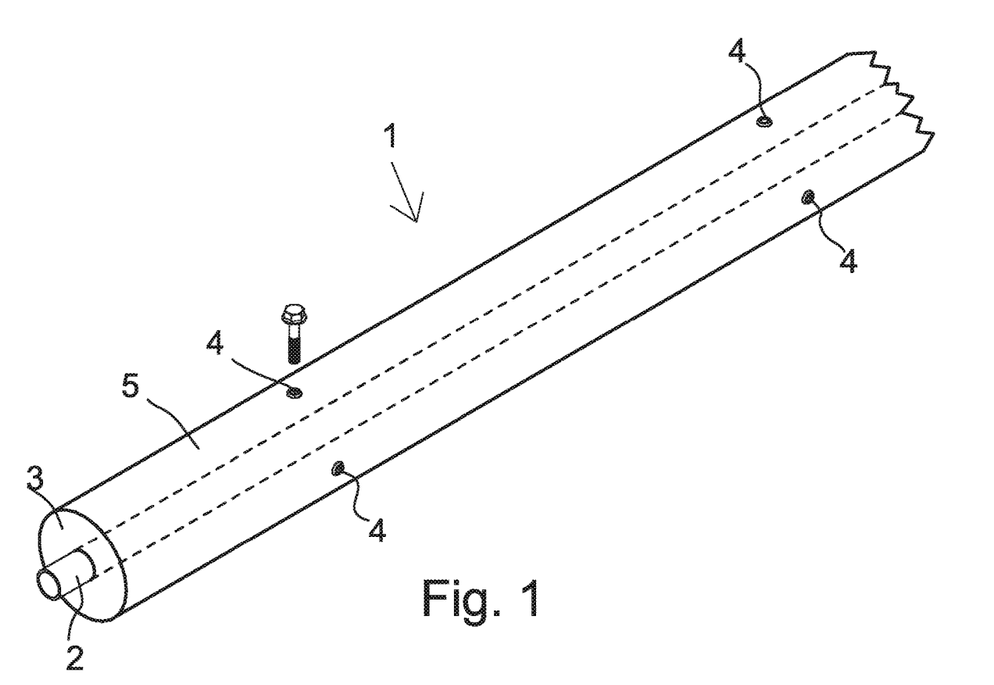
FIG. 1 is a schematic axonometric view of a thermal pre-insulated pipe section of the plumbing arrangement according to a first embodiment of the invention.

FIG. 1 shows a plumbing arrangement comprising a pre-insulated pipe section 1. The pre-insulated pipe section comprises a pipe 2 and a thermal insulation layer 3 of rigid foam molded to surround the pipe 2. The pipe may for example be a plastic pipe or a multilayer composite pipe (MLCP) or a cross-linked polyethylene (PEX) pipe. The rigid foam of the insulation layer 3 may be expanded polyurethane PUR or expanded polypropylene EPP or expanded polystyrene EPS or expanded polyisocyanurate PIR. The rigid foam of the insulation layer 3 has a density in the range of 20-120 kg/m$^3$. Preferably, the density is in the range 70-100 kg/m$^3$.

The pre-insulated pipe section 1 further comprises fasteners 4 which are made of rigid material, such as metal or rigid plastics. The fasteners 4 are fixedly connected to the insulation layer 3 as integral parts with the insulation layer 3 for connecting the pre-insulated pipe section 1 to another structure. Preferably, the insulation layer 3 is expanded around the pipe 2 in a mold, so that its dimensions become accurate. In the shown example the fasteners 4 are partly embedded in the insulation layer 3. In an embodiment wherein the fasteners 4 are included to the structure in connection with molding of the insulation layer 3, the positions of the fasteners 4 become very accurate. In another embodiment the fasteners 4 may be bonded with an adhesive on the outer surface of the insulation layer 3. In yet another embodiment the fasteners 4 may be bonded with a double sided tape on the outer surface 5 of the insulation layer 3.

Figure 2A:
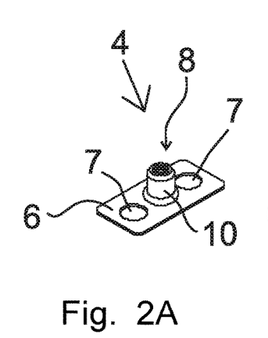
FIGS. 2A, 2B, 2C, and 2D show a few examples of fasteners to be used as fasteners in the pre-insulated pipe section of the plumbing arrangement according to the invention.
Figure 2B:
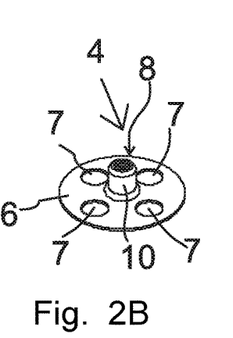
Figure 2C:
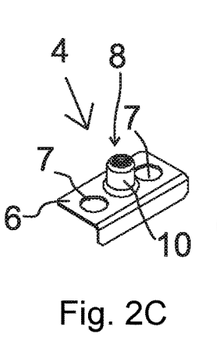
Figure 2D:
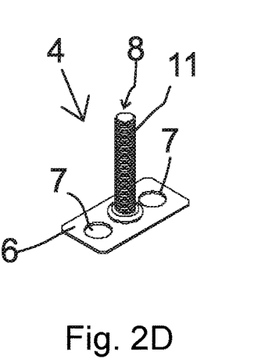

The fasteners 4 may be bonding fasteners of which some examples are shown in FIGS. 2A-D. A bonding fastener is a fastener 4 which comprises a baseplate 6 comprising perforations 7 which form passageways for the uncured foam during molding for securing the baseplate to the rigid foam, when the foam has been cured. Such a fastener further comprises a fastening member 8 arranged to the baseplate 6 for connecting the pre-insulated pipe section 2 to another structure. The number of perforations 7 in the baseplate 6 may be two or more. The baseplate 6 may have any suitable form. FIGS. 2A, 2C and 2D show fasteners 4 having a rectangular baseplate 6. FIG. 2B shows a fastener 4 having a circular baseplate 6. The baseplate 6 may be planar as shown in FIGS. 2A, 2B and 2D. Alternatively, the baseplate 6 may have one or more flanges bent at an angle in relation to the plane of the baseplate 6 as shown in FIG. 2C. FIGS. 2A-D show examples wherein the fastening member 8 comprises a hole 9 in the baseplate 6. FIGS. 2A-2C show examples wherein a rivet nut 10 is connected to the baseplate 6 in the hole 9. The rivet nut, also known as a blind rivet nut or threaded insert, is a one-piece internally threaded and counterbored tubular rivet that can be anchored to the baseplate entirely from one side. In FIG. 2D the fastening member 4 comprises a rivet screw 11 fixedly connected to the baseplate 6. The anchoring of the rivet screw to the baseplate is similar to that of the rivet nut.

In another (not-shown) example the fastener 4 may comprise a conventional hexagonal nut which is welded to the baseplate 6 coaxially with the hole 9. In yet another (not-shown) example the fastener 4 may comprise a screw or a threaded rod which is welded to the baseplate 6.

Figure 3:
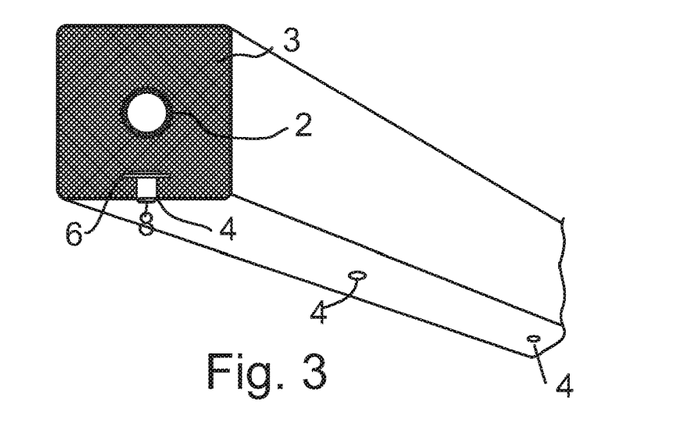
FIG. 3 shows a cross-section of the pre-insulated pipe section of the plumbing arrangement according to a second embodiment of the invention.
Figure 4:
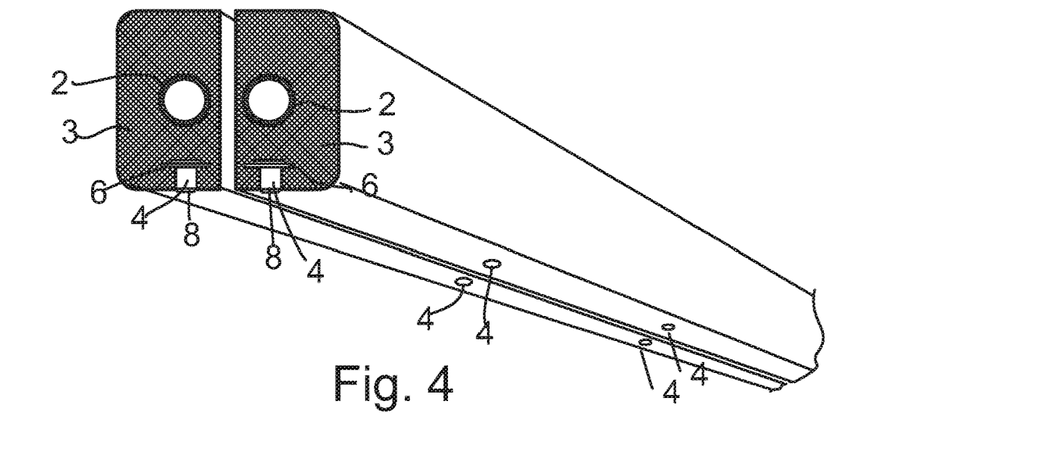
FIG. 4 shows cross-sections of the pre-insulated pipe sections of the plumbing arrangement according to a third embodiment of the invention.
Figure 5:
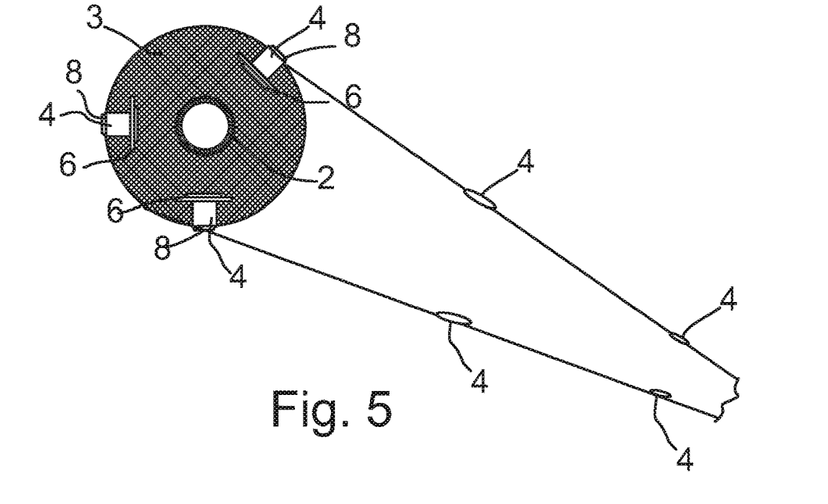
FIG. 5 shows a cross-section of the pre-insulated pipe section of the plumbing arrangement according to a fourth embodiment of the invention.

Referring to FIG. 1, the pre-insulated pipe section 1 comprises at least two fasteners 4 arranged at a distance from each other along the length of the pre-insulated pipe section 1. The pre-insulated pipe section 1 may comprise a plurality of fasteners 4 arranged at a distance from each other in one or more rows along the length of the pre-insulated pipe section, as also illustrated in FIGS. 3 to 5. FIGS. 3 to 5 also show that the pre-insulated pipe section may have different cross-sectional shapes, such as a square, a rectangle or a circle.

Figure 6:
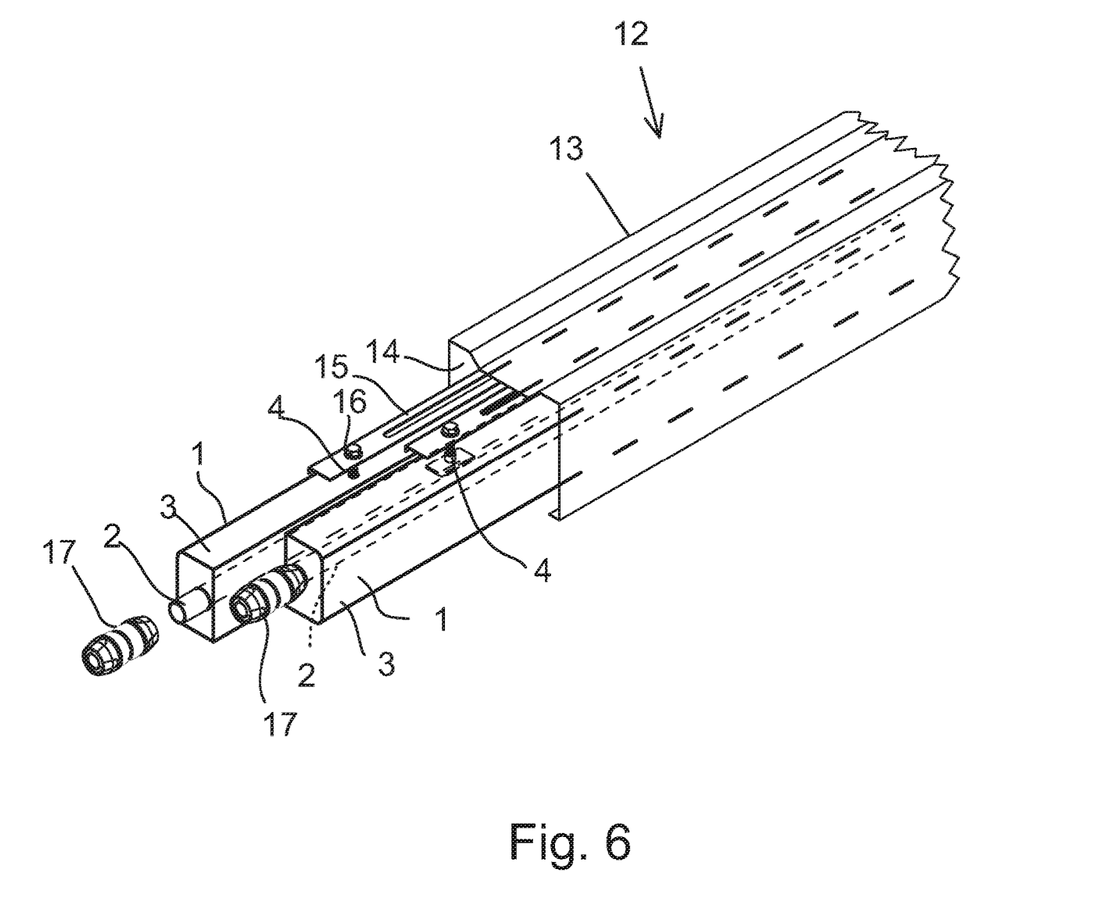
FIG. 6 is a schematic axonometric view of a plumbing arrangement according to a fifth embodiment of the invention.

FIG. 6 shows an embodiment of a plumbing arrangement which comprises a prefabricated installation module 12. The prefabricated installation module 12 has mounting means (not shown) for mounting in a room of a building to form continuous vertical plumbing lines together with other similar installation modules. The shown installation module 12 comprises two pre-insulated pipe sections 1. The installation module 12 also comprises a frame 13 or housing made of metal having an inner space 14 into which the pre-insulated pipe sections 1 are installed side-by-side and supported to the frame 13 with said fasteners 4. The frame 13 comprises a support member 15 comprising a counterpart 16 configured for connection to the fastener 4. The type of the counterpart is chosen be compatible with the fastener 4. Preferably the support member 15 is movably connected to the frame 13 so that it can be moved in longitudinal direction to facilitate coupling of the pipes 2 to another pipes. The installation module 12 further comprises push fittings 17 connected to an end part of the pipe 2 protruding outside from the insulation layer 3 of the pre-insulated pipe section 1. The installation of the installation modules 12 and connection of pipes may be made according to the principles disclosed in EP 3219867 A1.

Figure 7:
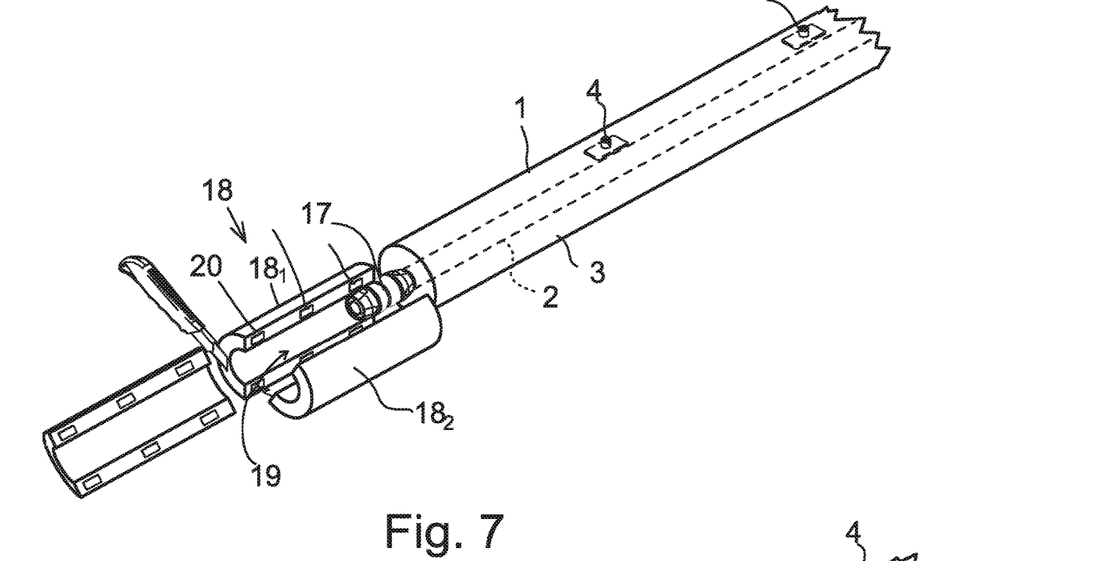
FIGS. 7 and 8 are a schematic axonometric views of a plumbing arrangement according to a sixth embodiment of the invention showing steps of coupling two pre-insulated pipe sections together with a push fitting to form a pipe line.
Figure 8:
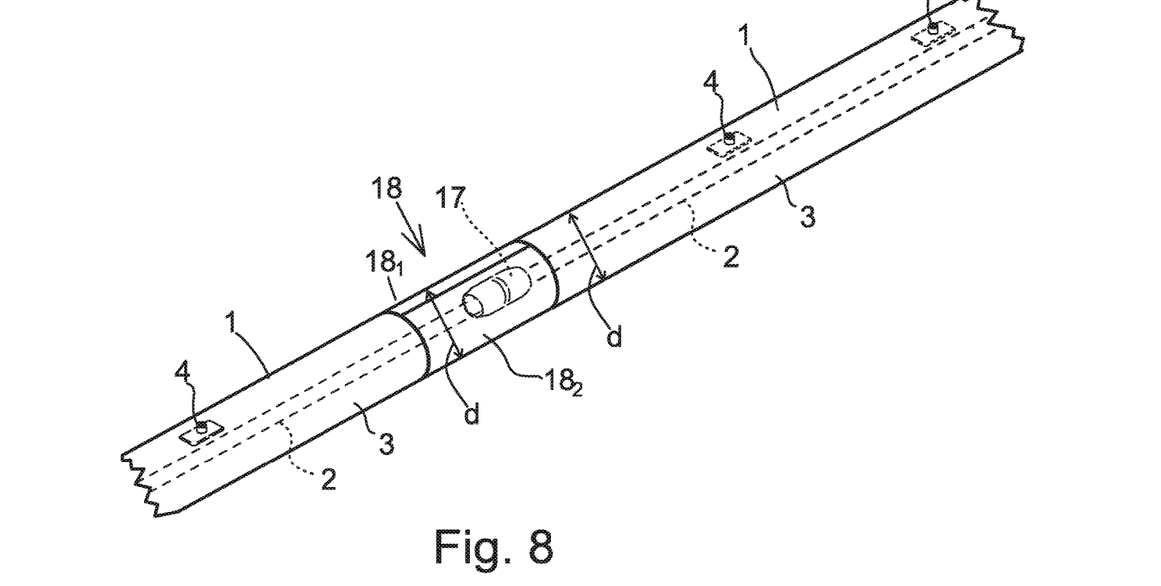

Referring to FIGS. 7 and 8, the plumbing arrangement comprises an extension insulation section 18 made of rigid foam and arranged in abutment with the pre-insulated pipe section 1 of FIG. 1. The extension insulation section 18 has an external dimension d conforming to the external dimension d of the pre-insulated pipe section 1. In this embodiment wherein the insulation layer 2 has a circular cross-section, the external dimension is the diameter of the insulation layer. The extension insulation section 18 has an inner channel 19 having an inner dimension (herein diameter) adapted to receive the push fitting 17 therein the extension insulation section 18 comprises two section halves $18_1$, $18_2$ having connecting elements 20 for detachable mutual connection of the section halves $18_1$, $18_2$. The section halves are preferably manufactured so that they are longer than required and can be cut to a suitable length during installation at the site of installation. The connecting elements 20 for connecting the section halves together can be e.g. a hook and loop fastener, a double-sided tape, a spike, a cable tie, a tongue and groove joint or a magnet. In FIGS. 7 and 8 the connecting elements 20 are magnets which are embedded and molded-in in the rigid foam material of the section halves $18_1$, $18_2$.

The rigid foam of the thermal insulation layer 3 may comprise a color pigment compounded to the foam material. When insulation layer 3 is made by molding in a mold the surface has a pleasant appearance and it may have a color which can e.g. signalize that cold or warm water is lead through the pipe. If the pre-insulated pipe is installed in the building so that it is visible, it is also advantageous that the insulation layer of the pre-insulated pipe can have a freely chosen color made at the time of manufacture, so that there is no need to apply a coating or to paint the pre-insulated pipe at the installation site.

Figures 9, 10:
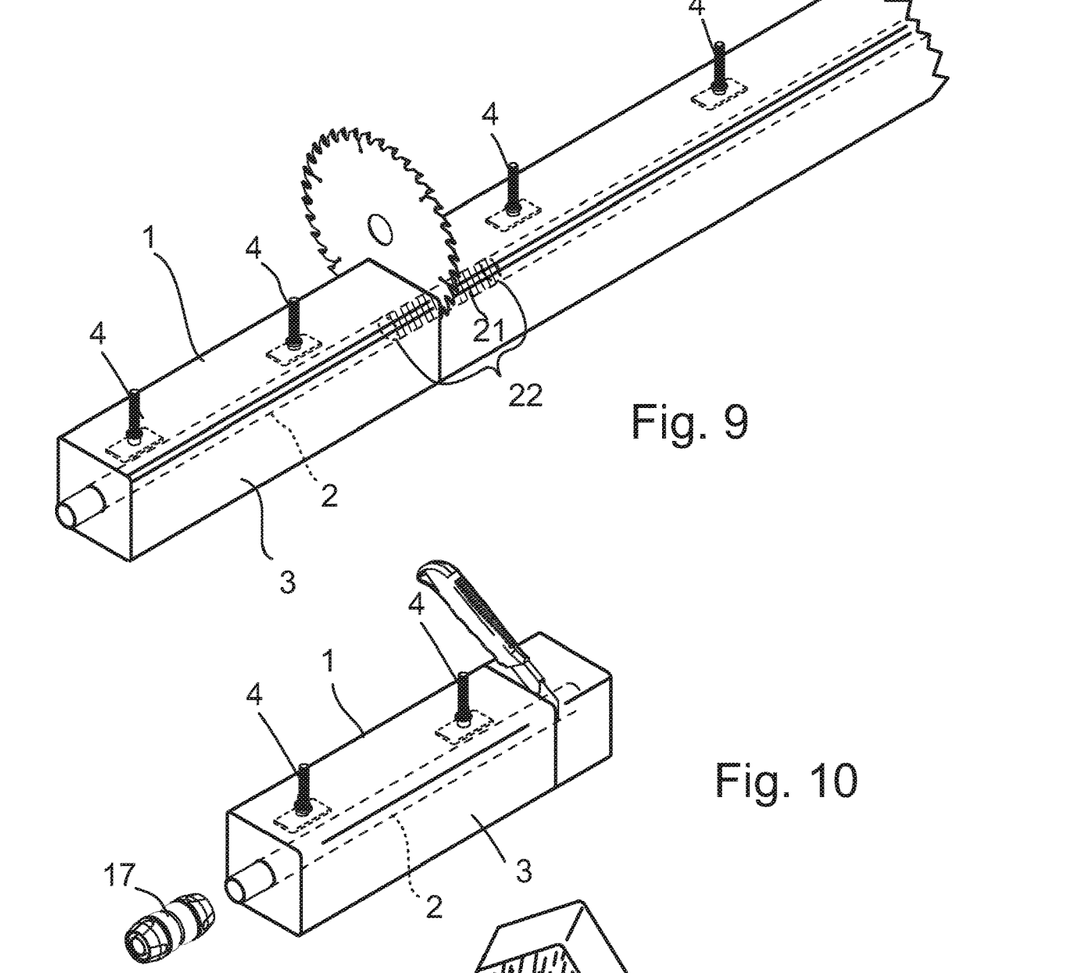
FIGS. 9 to 11 are a schematic axonometric views of a plumbing arrangement according to a seventh embodiment of the invention showing cutting of a preinsulated pipe section to a shorter piece for coupling of push fittings to both ends thereof.
Figure 11:
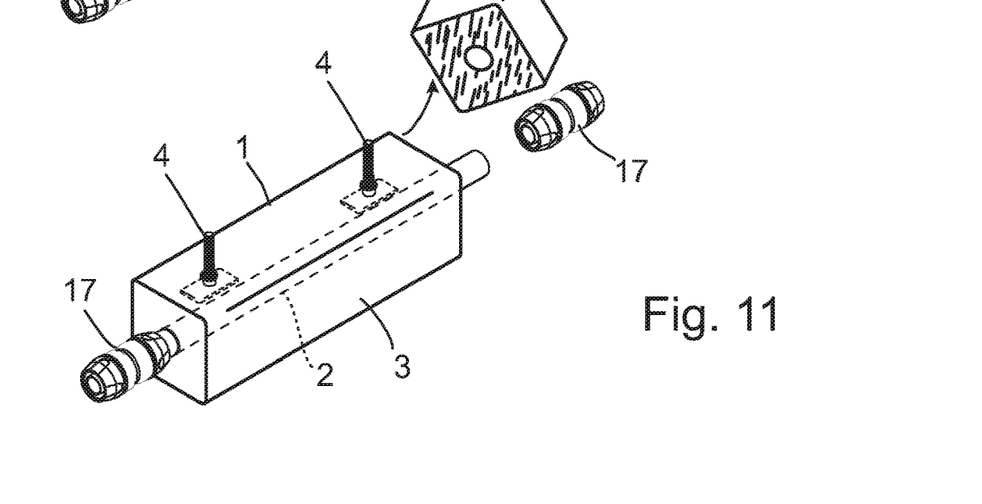

FIGS. 9 to 11 illustrate that the pre-insulated pipe section 1 of the invention may comprise a release agent 21, such as release wax, applied on a portion of length 22 of the pipe 2 to prevent bonding of the thermal insulation layer 3 to the pipe 2 at said portion of length 22. FIG. 10 shows that the pre-insulated pipe section 1 can then be cut to a suitable length at the area 22 wherein the release agent 21 has been applied, and the thermal insulation layer 3 can be peeled off from the pipe to reveal an end part of the pipe 2 which can then be connected by a push fitting 17 to another pipe 2 of another pre-insulated pipe section 1.

In this application by the term "push fitting" is meant a push-fit connector, fitting or coupling, for example such as a ring-tension memory (RTM) fitting, a snap fit connector a press-fit connector or a sliding sleeve connector wherein connection of the pipes may be formed without any tools. Push fitting, push-fit connector, fitting or coupling by definition in general means a fitting where the joint between two pipes or pipe sections may be done by pushing the end of one pipe or pipe section to a fitting arranged at the end of another pipe or pipe section. The fitting or coupling may comprise a socket for receiving the end of one pipe, and means for making a joint between the two pipes or pipe sections, i.e. means for achieving a seal or sealed connection between the two pipes or pipe sections. This may be for example a sealing ring, or a number of such sealing rings, or a sealing tube, made of elastic material. The push fitting may further comprise means for preventing removing the pipes or pipe sections from each other and preventing the thus formed connection. These means may for example comprise different gripping members such as compression rings, or clipping rings with connecting claws or such, or clamping rings. For example, in an RTM fitting the coupling between two pipes or pipe sections is achieved by arranging a pre-tensioned compression ring as a connecting mechanism into the fitting. It enables attaching a pipe into the fitting by inserting one end of the connecting pipe so far as to setting off tension of the compression ring which then, by striving to returning to its original form, induces and maintains even pressure around the composite pipe to form a watertight joint.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A plumbing arrangement comprising a pre-insulated pipe section, the pre-insulated pipe section comprising a pipe and a thermal insulation layer of rigid foam molded to surround the pipe, wherein the pre-insulated pipe section comprises fasteners made of rigid material fixedly connected to the insulation layer as integral parts for connecting the pre-insulated pipe section to another structure, wherein the fastener comprises a baseplate comprising perforations which form passageways for the uncured foam during molding for securing the baseplate to the rigid foam, when cured, and a fastening member arranged to the baseplate for connecting the pre-insulated pipe section to another structure.

2. The plumbing arrangement according to claim 1, wherein the fasteners are made metal of metal or rigid plastics.

3. The plumbing arrangement according to claim 1, wherein the fasteners are partly embedded in the insulation layer.

4. The plumbing arrangement according to claim 1, wherein the fasteners are bonded with an adhesive on the outer surface of the insulation layer.

5. The plumbing arrangement according to claim 1, wherein the fasteners are bonded with a double sided tape on the outer surface of the insulation layer.

6. The plumbing arrangement according to claim 1, wherein the fasteners are bonding fasteners.

7. The plumbing arrangement according to claim 6, wherein the fastening member comprises a hole in the baseplate.

8. The plumbing arrangement according to claim 7, wherein the fastening member comprises a nut connected to the baseplate coaxially with the hole.

9. The plumbing arrangement according to claim 8, wherein the nut is a rivet nut.

10. The plumbing arrangement according to claim 6, wherein the fastening member comprises a screw fixedly connected to the baseplate.

11. The plumbing arrangement according to claim 10, wherein the screw is a rivet screw connected to the baseplate.

12. The plumbing arrangement according to claim 1, wherein rigid foam of the insulation layer is expanded polyurethane (PUR) or expanded polypropylene (EPP) or expanded polystyrene (EPS) or expanded polyisocyanurate (PIR).

13. The plumbing arrangement according to claim 1, wherein the pre-insulated pipe section comprises at least two fasteners arranged at a distance from each other along the length of the pre-insulated pipe section.

14. The plumbing arrangement according to claim 1, wherein the pre-insulated pipe section comprises a plurality of fasteners arranged at a distance from each other in a row along the length of the pre-insulated pipe section.

15. The plumbing arrangement according to claim 14, wherein the pre-insulated pipe section comprises at least two rows of fasteners.

16. A plumbing arrangement comprising a pre-insulated pipe section, the pre-insulated pipe section comprising a pipe and a thermal insulation layer of rigid foam molded to surround the pipe, wherein the pre-insulated pipe section comprises fasteners made of rigid material fixedly connected to the insulation layer as integral parts for connecting the pre-insulated pipe section to another structure, wherein the plumbing arrangement comprises a prefabricated installation module having mounting means for mounting in a room of a building to form continuous vertical plumbing lines together with other similar installation modules, the installation module comprising the pre-insulated pipe section, and a frame made of metal and having an inner space into which the pre-insulated pipe section is installed and supported to the frame with said fasteners.

17. The plumbing arrangement according to claim 16, wherein the frame comprises a support member comprising a counterpart configured for connection to the fastener.

18. The plumbing arrangement according to claim 17, wherein that the support member is movably connected to the frame.

19. The plumbing arrangement according to claim 1, wherein the plumbing arrangement comprises a push fitting connected to an end part of the pipe protruding outside from the insulation layer of the pre-insulated pipe section.

20. The plumbing arrangement according to claim 19, wherein the plumbing arrangement comprises an extension insulation section made of rigid foam and arranged in abutment with the pre-insulated pipe section, the extension insulation section having an external dimension (d) conforming to the an external dimension (d) of the pre-insulated pipe section, and an inner channel having an inner dimension adapted to receive the push fitting therein, the extension insulation section comprising two section halves having connecting elements for detachably connecting the section halves together.

21. The plumbing arrangement according to claim 20, wherein the connecting elements are selected from the group: a hook and loop fastener, double-sided tape, a spike, a cable tie, a tongue and groove joint, a magnet.

22. The plumbing arrangement according to claim 21, wherein the connecting elements are magnets which are embedded and molded-in in the rigid foam material of the section halves.

23. The plumbing arrangement according to claim 1, wherein the rigid foam of the thermal insulation layer comprises a color pigment compounded to the foam material.

24. The plumbing arrangement according to claim 1, wherein the rigid foam of the insulation layer has a density in the range of 20-120 kg/m$^3$.

25. The plumbing arrangement according to claim 1, wherein the pre-insulated pipe section comprises a release agent, such as release wax, applied on a portion of length of the pipe to prevent bonding of the thermal insulation layer to the pipe at said portion of length.

* * * * *

UNITED STATES PATENT AND TRADEMARK OFFICE
CERTIFICATE OF CORRECTION

| | |
|---|---|
| PATENT NO. | : 10,865,932 B2 |
| APPLICATION NO. | : 16/292015 |
| DATED | : December 15, 2020 |
| INVENTOR(S) | : Teemu Inha et al. |

It is certified that error appears in the above-identified patent and that said Letters Patent is hereby corrected as shown below:

In the Claims

Column 6, Line 49, Claim 2:
After "wherein the fasteners are made"
Delete "metal" (first occurrence)

Column 6, Line 62, Claim 7:
After "The plumbing arrangement according to claim"
Delete "6" and
Insert -- 1 --

Column 7, Line 3, Claim 10:
After "The plumbing arrangement according to claim"
Delete "6" and
Insert -- 1 --

Column 8, Line 2, Claim 18:
After "The plumbing arrangement according to claim 18, wherein"
Delete "that"

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*